United States Patent
Kim et al.

(10) Patent No.: US 10,763,969 B2
(45) Date of Patent: *Sep. 1, 2020

(54) WAVEFORM GENERATOR

(71) Applicant: Electronics and Telecommunications Research Institute, Daejeon (KR)

(72) Inventors: Sungil Kim, Daejeon (KR); Jung Min Park, Daejeon (KR); Minje Song, Daejeon (KR); Minhyup Song, Daejeon (KR); Jae-Sik Sim, Sejong-si (KR); Joon Tae Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/439,294

(22) Filed: Jun. 12, 2019

(65) Prior Publication Data

US 2019/0379459 A1 Dec. 12, 2019

(30) Foreign Application Priority Data

Jun. 12, 2018 (KR) .......................... 10-2018-0067712

(51) Int. Cl.
*H04B 10/04* (2006.01)
*H04B 10/508* (2013.01)
(Continued)

(52) U.S. Cl.
CPC ......... *H04B 10/508* (2013.01); *H04B 10/564* (2013.01); *H04L 25/03834* (2013.01)

(58) Field of Classification Search
CPC .. H04B 10/508; H04B 10/564; H04B 10/516; H04B 10/2575; H04B 10/25753; H04B 10/25137; H04B 10/548
(Continued)

(56) References Cited

U.S. PATENT DOCUMENTS 7,142,570 B2 11/2006 Lee et al.
7,587,144 B2 * 9/2009 Ilchenko ................. G02F 1/011
398/183
(Continued)

FOREIGN PATENT DOCUMENTS

KR   10-1144301 B1   5/2012

OTHER PUBLICATIONS

Minhyup Song, et al., "Reconfigurable and Tunable Flat-Top Microwave Photonic Filters Utilizing Optical Frequency Combs", IEEE Photonics Technology Letters, vol. 23, No. 21, pp. 1618-1620, Nov. 1, 2011.

*Primary Examiner* — Hanh Phan
(74) *Attorney, Agent, or Firm* — Rabin & Berdo, P.C.

(57) ABSTRACT

An embodiment of the inventive concept includes an optical signal generating circuit, a controlling circuit, a waveform shaping circuit, and an output circuit. The optical signal generating circuit generates a first optical signal including pulses. The controlling circuit generates a control signal indicating a first pulse to be attenuated in magnitude among the pulses. The waveform shaping circuit attenuates a magnitude of the first pulse based on the control signal and the first optical signal, and generates a second optical signal including pulses corresponding to the pulses included in the first optical signal and the first pulse having the attenuated magnitude. The output circuit outputs an electric signal of bands corresponding to differences between frequencies of the pulses included in the second optical signal based on the second optical signal. A band corresponding to the first pulse among the bands of the electric signal is adjusted as the magnitude of the first pulse is attenuated.

15 Claims, 12 Drawing Sheets

(51) Int. Cl.
*H04B 10/564* (2013.01)
*H04L 25/03* (2006.01)
(58) Field of Classification Search
USPC ....... 398/183, 188, 187, 182, 192, 193, 158,
398/159, 115, 198, 197
See application file for complete search history.

(56) References Cited

U.S. PATENT DOCUMENTS

| | | | |
|---|---|---|---|
| 7,813,651 B2 | 10/2010 | Ilchenko et al. | |
| 10,454,523 B1* | 10/2019 | Kim | G02B 6/12007 |
| 2010/0092183 A1* | 4/2010 | Kim | H04B 10/2575 |
| | | | 398/183 |

* cited by examiner

WAVEFORM GENERATOR

CROSS-REFERENCE TO RELATED APPLICATIONS

This U.S. non-provisional patent application claims priority under 35 U.S.C. § 119 of Korean Patent Application No. 10-2018-0067712, filed on Jun. 12, 2018, the entire contents of which are hereby incorporated by reference.

BACKGROUND

The present disclosure herein relates to an opto-electronic device, and more particularly to, a waveform generator configured to generate a signal having an intended characteristic.

With the development of wireless communication systems, devices for processing data that is transmitted/received at high speed are being required. A radio frequency arbitrary waveform generator (RF AWG) is a device for generating RF signals having arbitrary waveforms. The RF AWG requires a broadband RF filter to handle broadband signals.

The RF AWG configured to generate an arbitrary signal on the basis of an electronic signal includes an analog-to-digital converter (ADC). The analog-to-digital converter may operate normally within a restricted bandwidth. The analog-to-digital converter may include noise due to surrounding environments such as a temperature change, etc. Therefore, a signal-to-noise ratio (SNR) of a signal output from the RF AWG on the basis of the electronic signal may be low.

The noise included in an optical signal due to the surrounding environments may be lower than the noise included in an electronic signal. Therefore, when the RF AWG uses an optical signal rather than an electronic signal, the signal-to-noise ratio of the signal output from the RF AWG may increase. Accordingly, RF AWGs for generating signals on the basis of optical signals are being actively developed.

SUMMARY

The present disclosure provides a waveform generator configured to generate a signal having a characteristic according to an instruction from a user.

An embodiment of the inventive concept provides a waveform generator including an optical signal generating circuit, a controlling circuit, a waveform shaping circuit, and an output circuit. The optical signal generating circuit may generate a first optical signal including pulses. The controlling circuit may generate a control signal indicating a first pulse to be attenuated among the pulses. The waveform shaping circuit may attenuate a magnitude of the first pulse on the basis of the control signal and the first optical signal, and may generate a second optical signal including pulses corresponding to the pulses included in the first optical signal and the first pulse having the attenuated magnitude. The output circuit may output an electric signal of bands corresponding to differences between frequencies of the pulses included in the second optical signal on the basis of the second optical signal. A band corresponding to the first pulse among the bands of the electric signal may be adjusted as the magnitude of the first pulse is attenuated.

BRIEF DESCRIPTION OF THE FIGURES

The accompanying drawings are included to provide a further understanding of the inventive concept, and are incorporated in and constitute a part of this specification. The drawings illustrate example embodiments of the inventive concept and, together with the description, serve to explain principles of the inventive concept. In the drawings.

DETAILED DESCRIPTION

Example embodiments of the inventive concept will be described in detail and clearly so that the present invention can be easily carried out by those skilled in the art.

Figure 1:
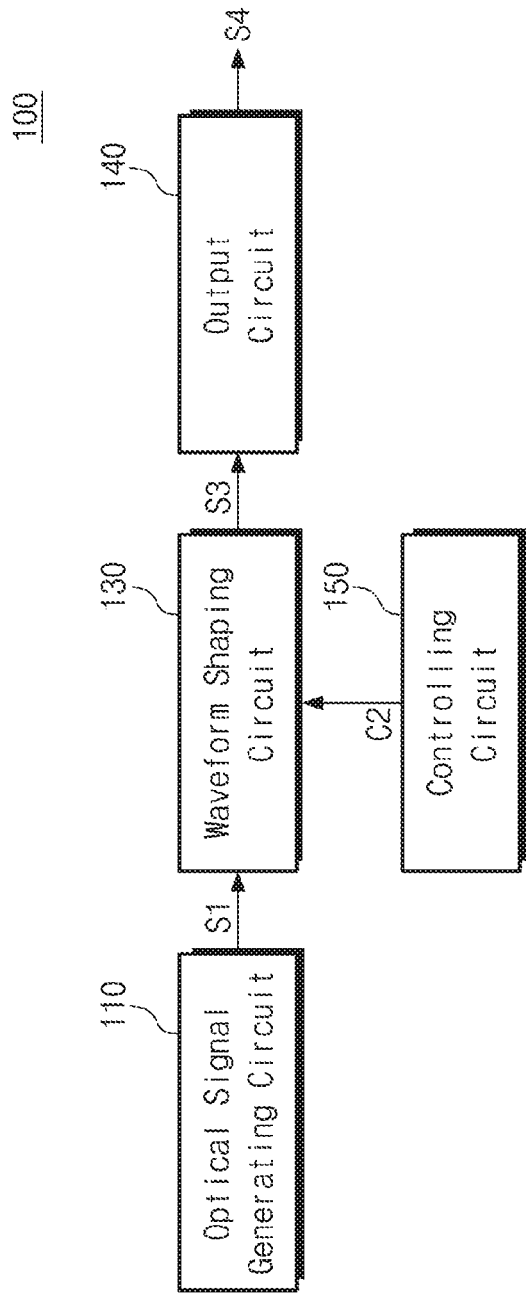
FIG. 1 is a block diagram illustrating a waveform generator according to an embodiment of the inventive concept.

FIG. 1 is a block diagram illustrating a waveform generator according to an embodiment of the inventive concept.

Referring to FIG. 1, a waveform generator 100 may include an optical signal generating circuit 110, a waveform shaping circuit 130, an output circuit 140, and a controlling circuit 150.

The optical signal generating circuit 110 may generate an optical signal S1. For example, the optical signal S1 may include an optical comb signal. The optical comb signal may include one or more pulses diffused so as to have different frequencies in a frequency domain. Each of the one or more pulses included in the optical comb signal may have a specific frequency.

Intervals between the pulses included in the optical comb signal may be substantially equal in a frequency domain. The term "interval" between pulses is used herein. The term "interval" may represent a difference between frequencies of pulses in a frequency domain.

For example, the frequencies of the pulses included in the optical comb signal may include first to third frequencies. The interval between the first frequency and the second frequency may be substantially equal to the interval between the second frequency and the third frequency. However, the inventive concept may include any embodiment in which at least two of the intervals between the pulses of the optical comb signal are different. The optical signal S1 including the optical comb signal will be described in more detail with reference to FIG. 4. The optical signal generating circuit 110 may output the optical signal S1 including the optical comb signal to the waveform shaping circuit 130.

For example, the optical signal generating circuit 110 may include a light emitting element (e.g., a laser diode) configured to generate a semiconductor laser.

The waveform shaping circuit 130 may receive the optical signal S1 from the optical signal generating circuit 110. The waveform shaping circuit 130 may receive the optical comb signal included in the optical signal S1. The waveform shaping circuit 130 may receive a control signal C2 from the controlling circuit 150.

The waveform shaping circuit 130 may operate normally on the basis of an optical signal having a magnitude within a reference range. The waveform shaping circuit 130 may obtain information related to the reference range from the control signal C2. For example, when the magnitudes of the pulses included in the optical signal S1 are outside the reference range, the waveform shaping circuit 130 may adjust the magnitude of the optical signal S1 on the basis of the control signal C2. For example, the waveform shaping circuit 130 may adjust the magnitudes of the pulses included in the optical signal S1 on the basis of the control signal C2. The waveform shaping circuit 130 may generate a new optical signal by adjusting the magnitude of the optical signal S1, and may operate normally on the basis of the new optical signal.

The waveform shaping circuit 130 may adjust, on the basis of the control signal C2, characteristics (e.g., pulse magnitude, pulse phase, interval between pulses, the number of pulses) of the new optical signal generated based on the optical signal S1. For example, the waveform shaping circuit 130 may decrease the magnitudes of the pulses included in the optical signal S1 on the basis of the control signal C2. The waveform shaping circuit 130 may adjust phases of the pulses included in the optical signal S1 on the basis of the control signal C2. Therefore, the waveform shaping circuit 130 may generate pulses corresponding to the pulses included in the optical signal S1 and having magnitudes and phases that are different from the magnitudes and phases of the pulses included in the optical signal.

The waveform shaping circuit 130 may generate an optical signal S3 including pulses having adjusted characteristics. The waveform shaping circuit 130 may output the optical signal S3 to the output circuit 140. A configuration and operation of the waveform shaping circuit will be described in more detail with reference to FIG. 2, and FIGS. 5 to 8.

The output circuit 140 may receive the optical signal S3 from the waveform shaping circuit 130. The output circuit 140 may disperse the optical signal S3 in a time domain. The output circuit 140 may perform frequency-time conversion on the optical signal S3 by dispersing the optical signal S3. For example, the output circuit 140 may include an optical fiber or the like to perform the frequency-time conversion.

The output circuit 140 may photoelectrically convert the dispersed optical signal S3 to generate a signal S4. For example, the output circuit 140 may include a photoelectric conversion element for converting the optical signal S3. An example configuration and operations of the output circuit 140 will be described in more detail with reference to FIG. 3.

The signal S4 may be an electric signal transmitted through wire. Alternatively, the signal S4 may be transmitted wirelessly. For example, the signal S4 may be a radio frequency (RF) signal. For example, in the case where the waveform generator 100 is a component of an electronic device (e.g., a mobile device or computing device), the signal S4 may be transmitted to other components (e.g., communication devices such as an antenna, etc.) of the electronic device. The signal S4 may then be transmitted from the electronic device to another electronic device.

The signal S4 may have at least one frequency band. For example, the magnitude of the signal S4 may be related to the magnitudes of the pulses included in the optical signal S3. Bandwidths of the frequency bands of the signal S4 may be related to the number of pulses included in the optical signal S3. The frequency band of the signal S4 may be related to the intervals between the pulses included in the signal S3.

The phases of the optical signal S3 may be related to a filtering characteristic of the signal S4. For example, the phases of the optical signal S3 may be related to a skirt characteristic of the signal S4. The skirt characteristic of the signal S4 may correspond to a shape factor of the signal S4. For example, the signal S4 may have characteristics of a filter. Therefore, the signal S4 may have a transition band in a frequency domain. The magnitude of the signal S4 may vary in the transition band. In the transition band, a change rate of the magnitude of the signal S4 depending on a frequency (i.e., a gradient of the magnitude of the signal S4 in a frequency domain) may correspond to the shape factor of the signal S4. For example, as the shape factor of the signal S4 increases, the change rate of the magnitude of the signal S4 according to a frequency may increase. A relationship between the signal S4 and the optical signal S3 will be described in more detail with reference to FIGS. 3 and 9.

The controlling circuit 150 may generate the control signal C2 for controlling the waveform shaping circuit 130. For example, the controlling circuit 150 may determine characteristics of pulses to be included in the optical signal S3, on the basis of a command received from a user or a device (e.g., a processor, a memory device, or the like) outside the waveform generator 100. The controlling circuit 150 may generate the control signal C2 for transferring information associated with the determined characteristics. The controlling circuit 150 may output the control signal C2 to the waveform shaping circuit 130.

For example, the controlling circuit 150 may determine pulses to be attenuated among the pulses included in the optical signal S1. The controlling circuit 150 may generate the control signal C2 indicating the pulses determined to be attenuated. The controlling circuit 150 may output the control signal C2 to the waveform shaping circuit 130.

The controlling circuit 150 may determine the reference range. For example, the controlling circuit 150 may store data indicating information related to the reference range. The controlling circuit 150 may determine the reference range on the basis of the stored data. For example, the controlling circuit 150 may obtain data related to the reference range on the basis of a command received from a user or another device outside the waveform generator 100. The controlling circuit 150 may determine the reference range on the basis of the obtained data. The controlling circuit 150 may generate the control signal C2 for transferring the data related to the reference range. The controlling circuit 150 may output the control signal C2 to the waveform shaping circuit 130.

Figure 2:
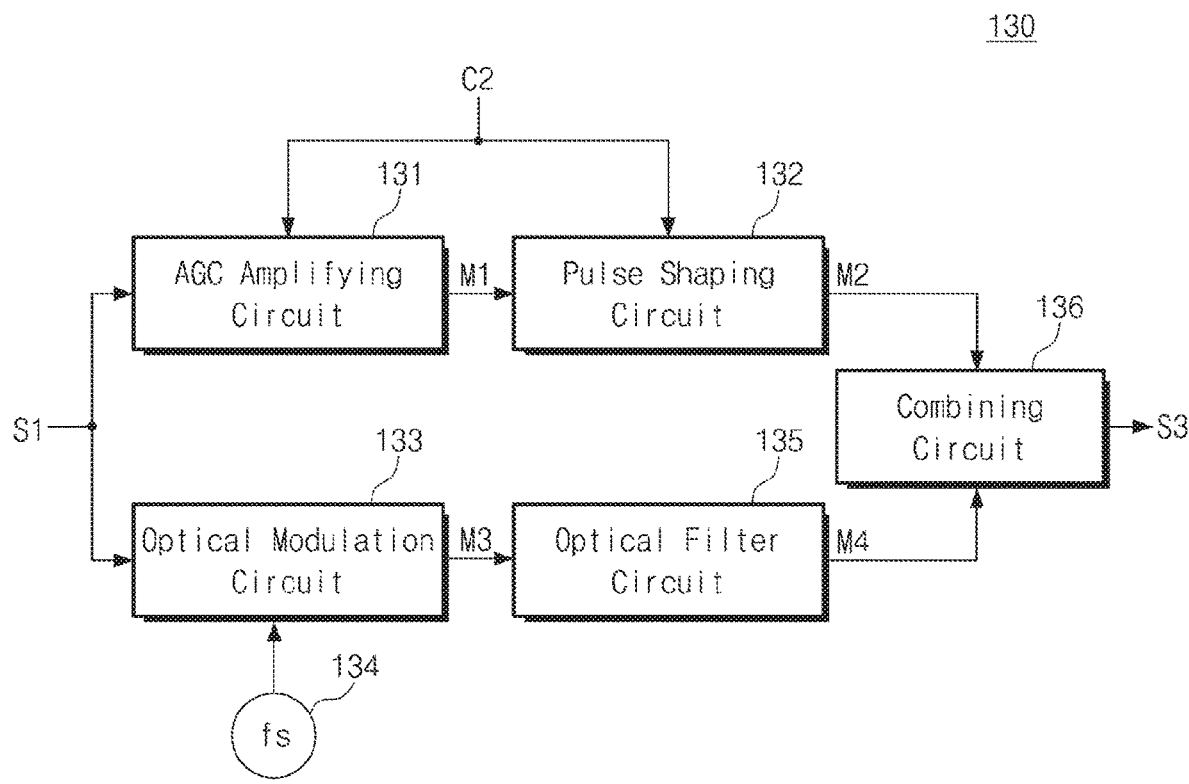
FIG. 2 is a block diagram illustrating an example configuration of the waveform shaping circuit of FIG. 1.

FIG. 2 is a block diagram illustrating an example configuration of the waveform shaping circuit of FIG. 1.

Referring to FIG. 2, the waveform shaping circuit 130 may include an automatic gain control (AGC) amplifying circuit 131, a pulse shaping circuit 132, an optical modulation circuit 133, an oscillator 134, an optical filter circuit 135, and a combining circuit 136.

The AGC amplifying circuit 131 may receive the optical signal S1 from the optical signal generating circuit 110 of FIG. 1. The AGC amplifying circuit 131 may receive the control signal C2 from the controlling circuit 150 of FIG. 1.

As described above with reference to FIG. 1, the waveform shaping circuit 130 may operate normally on the basis of an optical signal having a magnitude within a reference range. In more detail, the pulse shaping circuit 132 included in the waveform shaping circuit 130 may operate normally on the basis of an optical signal M1 including pulses having magnitudes within the reference range. For example, the reference range may be related to characteristics of circuit elements included in the pulse shaping circuit 132.

The AGC amplifying circuit 131 may obtain data related to the reference range from the control signal C2. The AGC amplifying circuit 131 may adjust the magnitudes of the pulses included in the optical signal S1 on the basis of the obtained data. The AGC amplifying circuit 131 may generate the optical signal M1 including pulses having adjusted magnitudes. The AGC amplifying circuit 131 may output the optical signal M1 to the pulse shaping circuit 132. An example operation of the AGC amplifying circuit 131 will be described in more detail with reference to FIG. 5.

The pulse shaping circuit 132 may receive the optical signal M1 from the AGC amplifying circuit 131. The pulse shaping circuit 132 may receive the control signal C2 from the controlling circuit 150 of FIG. 1. The pulse shaping circuit 132 may obtain, from the control signal C2, information related to characteristics (e.g., magnitude, phase, interval between pulses, and the number of pulses) of pulses.

The pulse shaping circuit 132 may generate an optical signal M2 on the basis of the optical signal M1 and the control signal C2. For example, the pulse shaping circuit 132 may adjust, on the basis of the control signal C2, the magnitudes, phases, and number of and interval between the pulses included in the optical signal M1 so as to generate the optical signal M2.

The pulse shaping circuit 132 may generate the optical signal M2 by adjusting the intervals between the pulses included in the optical signal M1 on the basis of the control signal C2. For example, as described above with reference to FIG. 1, the control signal C2 may indicate pulses to be attenuated among the pulses included in the optical signal S1. The pulses indicated by the control signal C2 may be determined or selected in response to a request from a user or another device.

The pulse shaping circuit 132 may adjust the intervals between the pulses included in the optical signal M2 by attenuating the magnitudes of pulses corresponding to pulses of the optical signal S1 indicated by the control signal C2 among the pulses included in the optical signal M1. For example, the pulse shaping circuit 132 may attenuate the magnitudes of specific pulses to "0" or approximately "0". When the magnitude of a specific pulse is attenuated to "0" or approximately "0", the interval between pulses on two sides of the specific pulse may appear to be increased. The pulse shaping circuit 132 may output the optical signal M2 to the combining circuit 136.

The pulse shaping circuit 132 may generate the optical signal M2 by adjusting the number of the pulses included in the optical signal M1 on the basis of the control signal C2. For example, the control signal C2 may indicate pulses to be attenuated among the pulses included in the optical signal S1.

The pulse shaping circuit 132 may adjust the number of pulses by attenuating the magnitudes of pulses indicated by the control signal C2 among the pulses included in the optical signal M1. For example, the pulse shaping circuit 132 may attenuate the magnitudes of pulses to "0" or approximately "0". When the magnitude of a specific pulse is attenuated to "0" or approximately "0", it may appear that the total number of pulses decreases. The pulse shaping circuit 132 may output the optical signal M2 to the combining circuit 136. An example operation of the pulse shaping circuit 132 will be described in more detail with reference to FIG. 6.

The optical modulation circuit 133 may receive the optical signal S1 including the optical comb signal from the optical signal generating circuit 110 of FIG. 1. The optical modulation circuit 133 may receive a signal having a reference frequency "fs" from the oscillator 134.

The optical modulation circuit 133 may adjust the frequencies of the pulses included in the optical signal S1 on the basis of the signal received from the oscillator 134. For example, the optical modulation circuit 133 may modulate the frequencies of the pulses so as to increase or decrease the frequencies of the pulses to the reference frequency fs. The optical modulation circuit 133 may generate an optical signal M3 including the pulses of modulated frequencies. The optical modulation circuit 133 may output the optical signal M3 to the optical filter circuit 135. An example operation of the optical modulation circuit 133 will be described in more detail with reference to FIG. 7.

The optical filter circuit 135 may receive the optical signal M3 from the optical modulation circuit 133. The optical signal M3 may include a noise while the frequency of the optical signal S1 is modulated by the optical modulation circuit 133. The optical filter circuit 135 may filter the noise included in the optical signal M3 so as to generate an optical signal M4. Therefore, the optical signal M4 may not include the noise of the optical signal M3, and thus may include components other than the noise.

For example, the optical filter circuit 135 may include at least one of a periodic optical filter or an arrayed grating filter to filter the noise of the optical signal M3. The optical filter circuit 135 may output the optical signal M4 to the combining circuit 136. The noise of the optical signal M3 and an example operation of the optical filter circuit 135 will be described in more detail with reference to FIG. 7.

The combining circuit 136 may receive the optical signal M2 from the pulse shaping circuit 132. The combining circuit 136 may receive the optical signal M4 from the optical filter circuit 135. The combining circuit 135 may generate the optical signal S3 by combining the optical signal M2 and the optical signal M4.

For example, when the frequency of the pulse included in the optical signal M2 is the same as the frequency of the pulse included in the optical signal M4, the combining circuit 136 may generate the optical signal S3 including pulses having a magnitude obtained by adding the pulses included in the optical signal M2 and the pulses included in the optical signal M4 (i.e., through operation of vector summation). For example, when the frequency of the pulse included in the optical signal M2 is different from the frequency of the pulse included in the optical signal M4, the combining circuit 136 may generate the optical signal S3 including both the pulses.

Therefore, the number of the pulses included in the optical signal S3 may be larger than the number of the pulses included in the optical signal M2. Furthermore, the number of the pulses included in the optical signal S3 may be larger than the number of the pulses included in the optical signal M4. The combining circuit 136 may output the optical signal S3 to the output circuit 140 of FIG. 1. That is, the waveform shaping circuit 130 may output the optical signal S3 having an increased number of pulses through operation of the optical modulation circuit 133 and optical filter circuit 135.

As described below with reference to FIG. 9, the number of the pulses included in the optical signal S3 may be related to the bandwidth of the band of the signal S4 output from the output circuit 140. As the optical signal M4 is combined with the optical signal M2 by the combining circuit 140, the bandwidth of the band of the signal S4 may increase. An example operation of the combining circuit 136 will be described in more detail with reference to FIG. 8.

As described above with reference to FIG. 1, the waveform shaping circuit 130 may adjust the magnitudes and phases of the pulses included in the optical signal S1 on the basis of the control signal C2. For example, the control signal C2 may be generated in response to a user's command or a request of another device, and the waveform shaping circuit 130 may output the optical signal S3 including pulses having magnitudes and phases adjusted in response to the user's command or the request of the other device.

Furthermore, the waveform shaping circuit 130 may adjust the intervals between the pulses included in the optical signal S1 on the basis of the control signal C2. The control signal C2 may be generated in response to a user's command or a request of another device, and the waveform shaping circuit 130 may output the optical signal S3 having pulse intervals in response to the user's command or the request of the other device.

The waveform shaping circuit 130 may adjust the number of the pulses included in the optical signal S1 on the basis of the control signal C2. The control signal C2 may be generated in response to a user's command or a request of another device, and the waveform shaping circuit 130 may output the optical signal S3 including an adjusted number of pulses.

Figure 3:
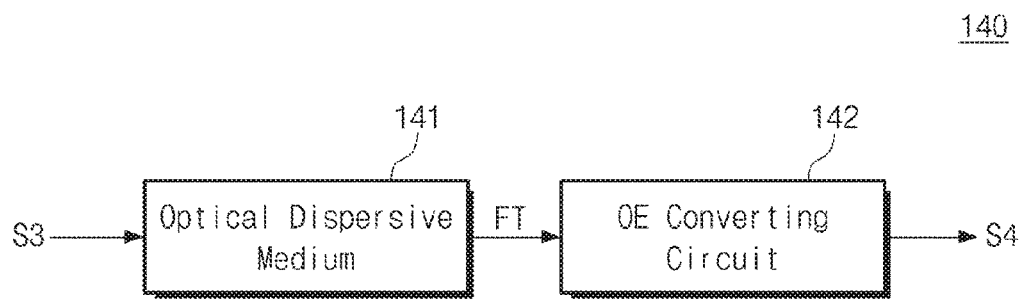
FIG. 3 is a block diagram illustrating an example configuration of the output circuit of FIG. 1.

FIG. 3 is a block diagram illustrating an example configuration of the output circuit of FIG. 1.

Referring to FIG. 3, the output circuit 140 may include an optical dispersive medium 141 and an optoelectric (OE) converting circuit 142.

The optical dispersive medium 141 may receive the optical signal S3 from the combining circuit 136 of the waveform shaping circuit 130. The optical dispersive medium 141 may disperse the optical signal S3 in a time domain on the basis of the frequencies of the pulses included in the optical signal S3. For example, the optical dispersive medium 141 may include an optical fiber or the like having a chromatic dispersion characteristic.

For example, the optical dispersive medium 141 may output pulses having a high frequency earlier than pulses having a lower frequency among signal components included in the optical signal S3. As the signal S3 is dispersed in a time domain by the optical dispersive medium 141, the optical dispersive medium 141 may output an optical signal FT. The optical signal FT may include optical signals dispersed in a time domain for each frequency.

The OE converting circuit 142 may receive the optical signal FT from the optical dispersive medium 141. The OE converting circuit 142 may generate the signal S4 by performing photoelectric conversion on the basis of the optical signal FT. For example, the OE converting circuit 142 may photomix dispersed pulses of the optical signal FT. Furthermore, the OE converting circuit 142 may generate the signal S4 by photoelectrically converting the photomixed optical signal.

For example, the OE converting circuit 142 may perform an operation on dispersed optical signals included in the optical signal FT in order to perform photomixing. For example, the OE converting circuit 142 may perform a dot product operation on the pulses included in the optical signal FT. The OE converting circuit 142 may generate pulses having result values of the dot product operation as magnitudes.

The OE converting circuit 142 may include a photoelectric conversion element for photoelectrically converting the optical signal FT. For example, the OE converting circuit 142 may include a photoconductive sensor, a photodiode, a phototransistor, a solar cell, a photoconductive image sensor, a CCD image sensor, etc. using an internal photoelectric effect. Alternatively, the OE converting circuit 142 may include a photoelectric tube, a photomultiplier tube, a photoemissive image sensor, etc. using an external photoelectric effect. The OE converting circuit 142 may output the signal S4 as an output signal of the waveform generator 100.

The magnitude of the signal S4 may be related to the magnitudes of the pulses included in the optical signal FT. Since the optical signal FT is generated on the basis of the optical signal S3, the magnitude of the signal S4 may be related to the magnitudes of the pulses included in the optical signal S3. Since the optical signal FT is generated on the basis of the optical signal M1 and the optical signal M2, the magnitude of the signal S4 may be related to the magnitudes of the pulses included in the optical signal M1 and optical signal M2.

The shape factor of the signal S4 may be related to the phases of the pulses included in the optical signal FT. Since the optical signal FT is generated on the basis of the optical signal S3, the shape factor of the signal S4 may be related to the phases of the pulses included in the optical signal S3. Since the optical signal FT is generated on the basis of the optical signal M1 and the optical signal M2, the shape factor of the signal S4 may be related to the phases of the pulses included in the optical signal M1 and optical signal M2.

The signal S4 may have at least one frequency band. The frequency bands of the signal S4 may be related to the intervals between the pulses included in the optical signal FT. Since the optical signal FT is generated on the basis of the optical signal S3, the frequency bands of the signal S4 may be related to the intervals between the pulses included in the optical signal S3. Since the optical signal FT is generated on the basis of the optical signal M1 and the optical signal M2, the frequency bands of the signal S4 may be related to the intervals between the pulses included in the optical signal M1 and optical signal M2.

That is, the frequency bands of the signal S4 may correspond to differences between the frequencies of the pulses included in the optical signal S3. The frequency bands of the signal S4 may correspond to differences between the frequencies of the pulses included in the optical signal M1 and optical signal M2. As described above with reference to FIG. 2, the waveform shaping circuit 132 may attenuate the magnitudes of pulses corresponding to specific frequencies among the pulses included in the optical signal S1 so as to adjust the intervals between the pulses. As the magnitudes of the pulses included in the optical signal S1 is attenuated, the frequency bands of the signal S4 corresponding to attenuated pulses may be adjusted.

The number of the frequency bands of the signal S4 may be related to the intervals between the pulses included in the optical signal FT. In detail, the number of the frequency bands may be related to the number of values that the intervals between the pulses have.

The bandwidths of the frequency bands may be related to the number of the pulses included in the optical signal FT. Since the optical signal FT is generated on the basis of the optical signal S3 combined by the combining circuit 136, the bandwidth may be related to the number of the pulses included in the optical signal S3. Since the optical signal S3 is generated on the basis of the optical signal M3 and the optical signal M4, the bandwidth may be related to the number of the pulses included in the optical signal M3 and optical signal M4.

As described above with reference to FIG. 1, a user may adjust characteristics of the optical signal S3 generated by the waveform shaping circuit 130 on the basis of the control signal C2 generated by the controlling circuit 150. As described below with reference to FIG. 3, the characteristics of the signal S4 may correspond to the characteristics of the signal S3. Therefore, the user may adjust the characteristics of the signal S4 on the basis of the control signal C2 generated by the controlling circuit 150.

Figure 4:
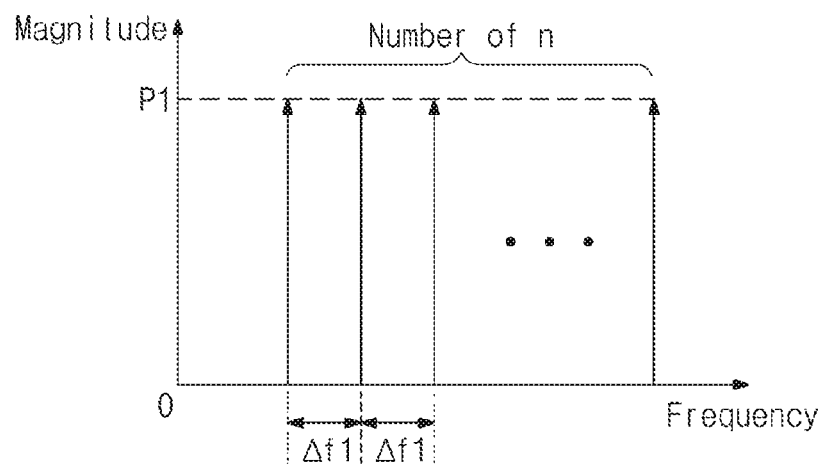
FIG. 4 is a graph illustrating an example optical signal generated by the optical signal generating circuit of FIG. 1.

FIG. 4 is a graph illustrating an example optical signal generated by the optical signal generating circuit of FIG. 1. In the example of FIG. 4, the x-axis may represent a frequency in hertz [Hz]. The y-axis may represent the magnitude of the pulses included in the optical signal S1.

As described above with reference to FIGS. 1 and 2, the optical signal S1 may include the optical comb signal. Referring to FIG. 4, the optical signal S1 may include n number of pulses in a frequency domain (where n is a natural number). The magnitudes of the pulses may be "P1". The intervals between the pulses may be "Δf1". Although not illustrated in FIG. 4, the phases of the pulses may be "0". Although FIG. 4 illustrates that the all of the intervals between the pulses are "Δf1", all of the magnitudes of the pulses are "P1", and all of the phases of the pulses are "0" for better description, the inventive concept may include any example of the optical signal S1 having different intervals, different magnitudes, and different phases.

Figure 5:
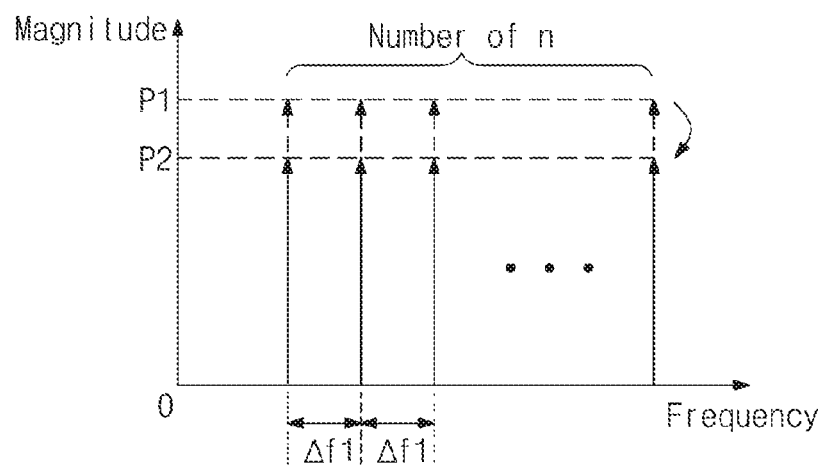
FIG. 5 is a graph illustrating an example optical signal generated by the AGC amplifying circuit of FIG. 2.

FIG. 5 is a graph illustrating an example optical signal generated by the AGC amplifying circuit of FIG. 2. In the example of FIG. 5, the x-axis may represent a frequency in hertz [Hz]. The y-axis may represent the magnitude of the pulses included in the optical signal M1.

Referring to FIG. 5, the optical signal M1 may include n number of pulses in a frequency domain. The magnitudes of the pulses may be "P2". For better description, an example in which "P2" is smaller than "P1" (i.e., an example in which the AGC amplifying circuit 131 attenuates the magnitude of the optical signal S1) will be described, but it should be understood that "P2" may be equal to or larger than "P1".

Although not illustrated in FIG. 5, the phases of the pulses included in the optical signal M1 may be substantially the same as the phases of the pulses included in the optical signal S1. In the example of FIG. 5, the phases of the pulses included in the optical signal M1 may be "0". The intervals between the pulses included in the optical signal M1 may be substantially the same as the intervals between the pulses included in the optical signal S1. In the example of FIG. 5, the intervals between the pulses included in the optical signal M1 may be "Δf1".

As described above with reference to FIG. 2, the pulse shaping circuit 132 may operate normally on the basis of pulses having a magnitude within the reference range. The AGC amplifying circuit 131 may adjust the magnitudes of the pulses included in the optical signal S1 within the reference range. In FIG. 5, the dotted lines may represent the pulses included in the optical signal S1, and the solid lines may represent the pulses included in the optical signal M1. The AGC amplifying circuit 131 may decrease the magnitude of the pulses included in the optical signal S1 from "P1" to "P2" to generate the optical signal M1. "P2" may be a value which falls within the reference range of the pulse shaping circuit 132.

Figure 6:
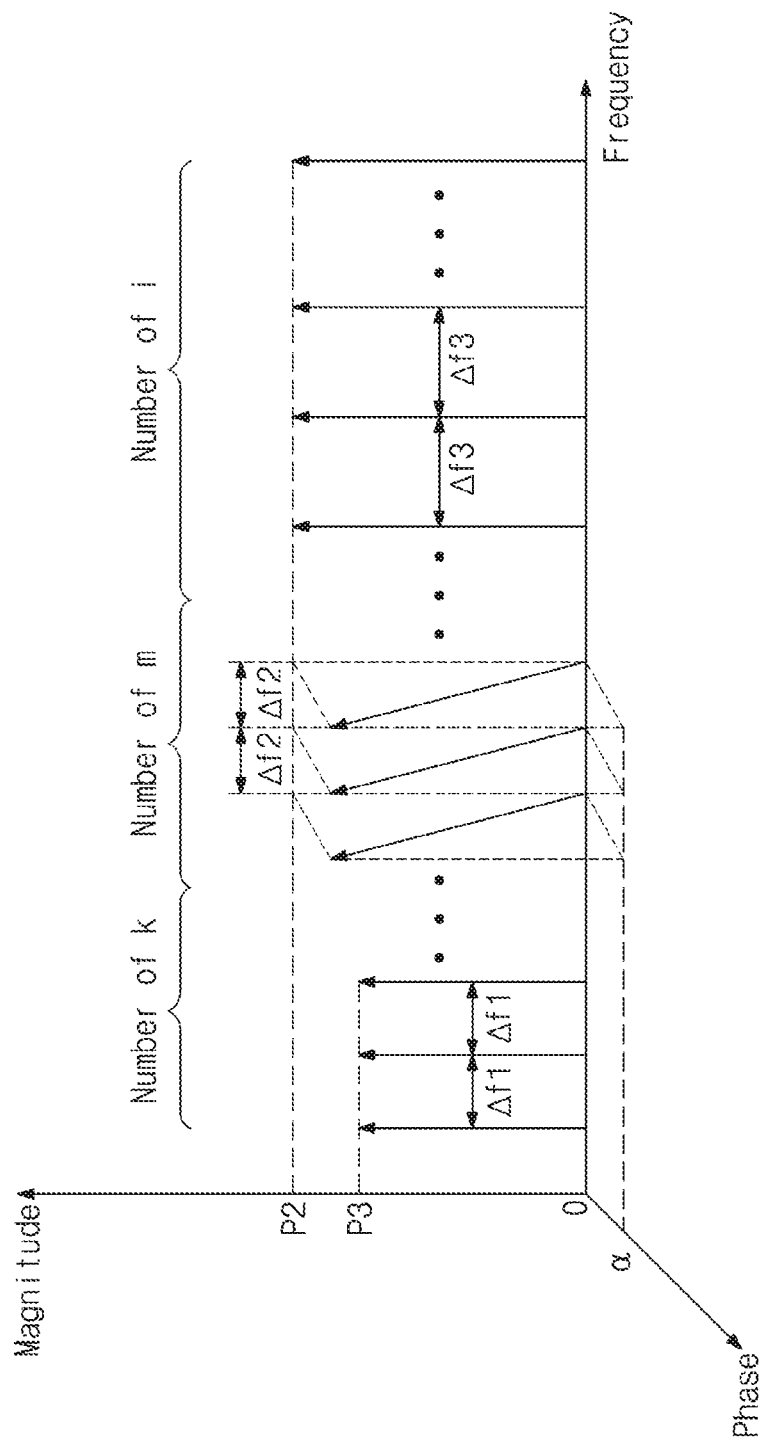
FIG. 6 is a graph illustrating an example optical signal generated by the pulse shaping circuit of FIG. 2.

FIG. 6 is a graph illustrating an example optical signal generated by the pulse shaping circuit of FIG. 2. In the example of FIG. 6, the x-axis may represent a frequency in hertz [Hz]. The y-axis may represent the magnitude of the pulses included in the optical signal M2. The z-axis may represent a phase in degree [°].

Referring to FIG. 6, the optical signal M2 may include pulses in a region R1, a region R2, and a region R3 in a frequency domain. The optical signal M2 may include k number of pulses in the region R1. The optical signal M2 may include m number of pulses in the region R2. The optical signal M2 may include i number of pulses in the region R3.

The magnitudes of the pulses in the region R1 may be "P3" and the phases may be "0". The intervals between the pulses in the region R1 may be "Δf1". The magnitudes of the pulses in the region R2 may be "P2" and the phases may be "α". The intervals between the pulses in the region R2 may be "Δf2". The magnitudes of the pulses in the region R3 may be "P2" and the phases may be "0". The intervals between the pulses in the region R3 may be "Δf3".

As described above with reference to FIG. 2, the pulse shaping circuit 132 may adjust the magnitudes of the pulses included in the optical signal M1. The pulse shaping circuit 132 may adjust the magnitudes of k number of pulses in the region R1 among n number of pulses included in the optical signal M1. For example, the pulse shaping circuit 132 may decrease the magnitudes of the pulses included in the region R1 from "P2" to "P3".

The pulse shaping circuit 132 may adjust the phases of the pulses included in the optical signal M1. The pulse shaping circuit 132 may adjust the phases of m number of pulses in the region R1 among n number of pulses included in the optical signal M1. For example, the pulse shaping circuit 132 may adjust the phases of the pulses included in the region R2 from "0" to "α".

As described above with reference to FIG. 2, the pulse shaping circuit 132 may adjust the intervals between the pulses included in the optical signal M1. Furthermore, the pulse shaping circuit 132 may adjust the number of the pulses included in the optical signal M1.

The pulse shaping circuit 132 may adjust the intervals between the pulses included in the region R2 to generate m number of pulses. For example, the pulse shaping circuit 132 may decrease the magnitudes of some pulses among the pulses included in the region R2 from "P2" to "0". For example, the pulse shaping circuit 132 may attenuate pulses between two pulses so as to adjust the interval between the two pulses. Therefore, the intervals between the pulses in the region R2 may increase from "Δf1" to "Δf2".

The pulse shaping circuit 132 may adjust the intervals between the pulses included in the region R3 to generate i number of pulses. For example, the pulse shaping circuit 132 may decrease the magnitudes of some pulses among the pulses included in the region R3 from "P2" to "0". For example, the pulse shaping circuit 132 may attenuate pulses between two specific pulses so as to adjust the interval between the two pulses. Therefore, the intervals between the pulses in the region R3 may increase from "Δf1" to "Δf3".

Since the magnitudes of some pulses among the pulses included in the region R3 are attenuated, the number of the pulses included in the region R3 may decrease. Therefore, the number "k+m+i" of the pulses included in the optical signal M2 may be smaller than the number "n" of the pulses included in the optical signal M1.

Figure 7:
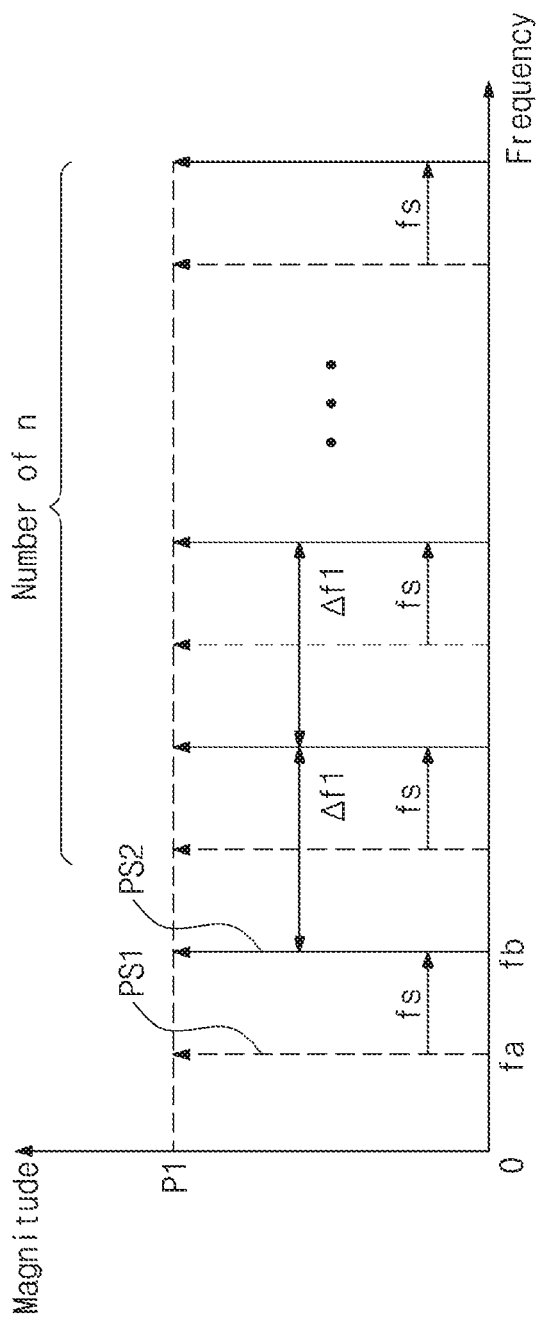
FIG. 7 is a graph illustrating an example optical signal generated by the optical modulation circuit of FIG. 2.

FIG. 7 is a graph illustrating an example optical signal generated by the optical modulation circuit of FIG. 2. In the example of FIG. 7, the x-axis may represent a frequency in hertz [Hz]. The y-axis may represent the magnitude of the pulses included in the optical signal M3.

In FIG. 7, the dotted lines represent noise corresponding to the pulses (i.e., the pulses illustrated in FIG. 4) included in the optical signal S1. The solid lines represent the pulses included in the optical signal M3. Referring to FIG. 7, the optical signal M3 may include n number of pulses. The magnitudes of the pulses may be "P1", and the intervals between the pulses may be "Δf1". Although not illustrated in FIG. 7, the phases of the pulses may be "0".

As described above with reference to FIG. 2, the optical modulation circuit 133 may adjust the frequencies of the pulses. The optical modulation circuit 133 may receive a signal having a reference frequency "fs" from the oscillator 134. The optical modulation circuit 133 may adjust the frequencies of the pulses included in the optical signal M3 on the basis of the signal received from the oscillator 134. In the example of FIG. 7, the optical modulation circuit 133 may adjust the frequencies of the pulses by as much as "fs".

The optical modulation circuit 133 may modulate the frequencies of the pulses included in the optical signal S1 to generate the optical signal M3. A noise may be generated while the optical signal M3 is generated from the optical signal S1 by the optical modulation circuit 133. The optical modulation circuit 133 may modulate a frequency "fa" of a pulse PS1 to generate a pulse PS2 having a frequency "fb". During modulation of the frequency of the pulse PS1, some components of the pulse PS1 may cause generation of a noise. Therefore, the optical signal M3 may include a noise (residual components after modulation) having a frequency "fa".

The optical filter circuit 135 may receive the optical signal M3 of FIG. 7 from the optical modulation circuit 133. The optical filter circuit 135 may filter the noise included in the optical signal M3. For example, the optical filter circuit 135 may include a notch filter configured to block the noise included in the optical signal M3. The notch filter may be implemented as one of a periodic optical filter, an arrayed grating filter, and the like. The notch filter may be configured to attenuate the magnitudes of signals having frequencies included in a stop band.

For example, a designer may design the notch filter so that the stop band of the notch filter includes frequency bands of a noise. The optical filter circuit 135 may pass the optical signal M3 through the notch filter so as to block noise corresponding to the signals illustrated in dotted lines. Therefore, the optical signal M4 may correspond to the solid lines in FIG. 7.

Figure 8:
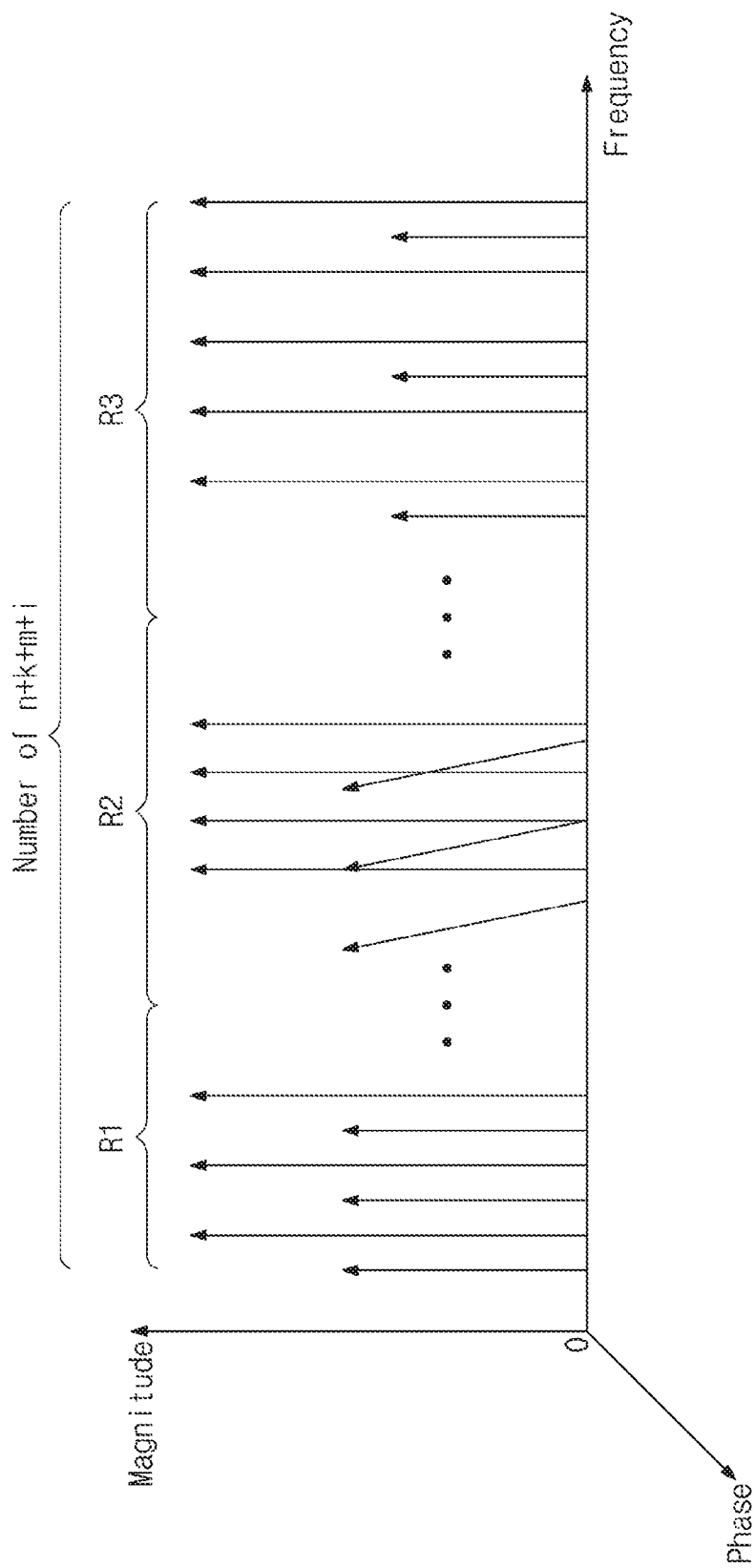
FIG. 8 is a graph illustrating an example optical signal generated by the coupling circuit of FIG. 2.

FIG. 8 is a graph illustrating an example optical signal generated by the coupling circuit of FIG. 2. In the example of FIG. 8, the x-axis may represent a frequency in hertz [Hz]. The y-axis may represent the magnitude of the pulses included in the optical signal S3. The z-axis may represent a phase in degree [°].

Referring to FIG. 8, the optical signal S3 may include "n+k+m+i" number of pulses. The optical signal S3 of FIG. 8 may include the pulses illustrated in FIG. 6 (the pulses of the optical signal M2) and the pulses illustrated in solid lines in FIG. 7 (the pulses of the optical signal M4).

The combining circuit 136 may combine the optical signal M2 and the optical signal M4. An example in which the frequencies of the pulses included in the optical signal M2 are different from the frequencies of the pulses included in the optical signal M4 will be described with reference to FIG. 8. However, as described above with reference to FIG. 2, at least two of the frequencies included in the optical signal M2 and optical signal M4 may be the same.

When the frequency of the pulse included in the optical signal M2 is different from the frequency of the pulses included in the optical signal M4, the combining circuit 136 may generate the optical signal S3 including both the pulses. Therefore, the number of the pulses included in the optical signal S3 may be "n+k+m+i" obtained by adding the number "k+m+i" of the pulses included in the optical signal M2 and the number "n" of the pulses included in the optical signal M4. However, an embodiment of the inventive concept is not limited to the example of FIG. 8, and thus may include any example of the combining circuit 136 configured to combine at least two pulses of the same frequency on the basis of an operation of vector summation. In this case, the number of the pulses included in the optical signal S3 may be smaller than "n+k+m+i".

Figure 9:
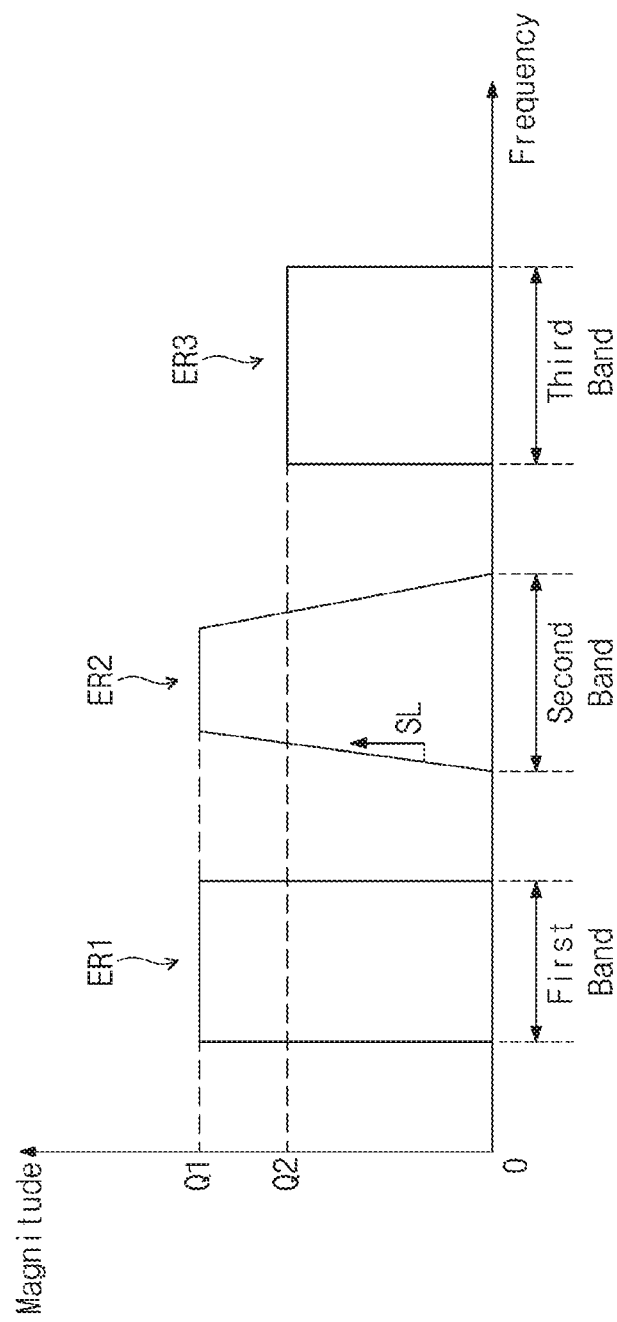
FIG. 9 is a graph illustrating an example signal generated by the OE converting circuit of FIG. 3.

FIG. 9 is a graph illustrating an example signal generated by the OE converting circuit of FIG. 3. In the example of FIG. 9, the x-axis may represent a frequency in hertz [Hz]. The y-axis may represent the magnitude of the signal S4.

Referring to FIG. 9, the signal S4 may include a signal ER1 of a first band. The magnitude of the signal ER1 may be "Q1". The signal S4 may include a signal ER2 of a second band. The magnitude of the signal ER2 may be "Q1". The signal ER2 may include a component represented as a graph having a gradient of "SL". The signal S4 may include a signal ER3 of a third band. The magnitude of the signal ER3 may be "Q2". The first to third bands may not overlap each other. The bandwidth of the third band may be larger than the bandwidth of the second band. The bandwidth of the second band may be larger than the bandwidth of the first band.

FIG. 9 illustrates the signals ER1, ER2, and ER3 having a flat magnitude according to a frequency. However, an embodiment of the inventive concept is not limited thereto, and it could be understood that the magnitudes of the signals ER1, ER2, and ER3 may vary with a frequency.

As described above with reference to FIG. 3, the output circuit 140 may photoelectrically convert the optical signal S3 to generate the signal S4. As described above with reference to FIG. 3, since the OE converting circuit generates the signal S4 by converting the optical signal FT, and the optical dispersive medium 141 generates the optical signal FT on the basis of the optical signal S3, the characteristics of the signal S4 may be related to the characteristics of the optical signal S3.

For better description, an example in which pulses of a specific region included in the optical signal S3 of FIG. 3 one-to-one correspond to the signal of a specific band of FIG. 9 will be described. However, an embodiment of the inventive concept is not limited thereto, and thus may include any example in which arbitrary pulses included in the optical signal S3 correspond to the signal of a specific band included in the signal S4.

Referring to FIGS. 6, 8, and 9, the magnitudes of the pulses of FIG. 8 may be related to the magnitudes (e.g., "Q1" and "Q2") of the signals ER1 to ER3 of FIG. 9. For example, the magnitude of the signal ER3 of the third band may be related to the magnitudes of the pulses of the region R1. For example, the magnitude of the signal ER3 of the third band and the magnitudes of the pulses of the region R1 may have a positive correlation.

The phases of the pulses of FIG. 8 may be related to the shape factors of the signals ER1 to ER3 of FIG. 9. The shape factors of the signals ER1 to ER3 may be related to change rates (e.g., "SL") of the magnitudes relative to the frequencies of the signals ER1 to ER3.

For example, the waveform shaping circuit 130 may adjust the phases of the pulses included in the optical signal S1. The optical signal M3 may include pulses having a phase "α" in the region R2. The output circuit 140 may output the signal ER2 having a shape factor corresponding to the value of "SL", in response to the pulses having the phase "α". The shape factor of the signal ER may be adjusted according to the phase "α" adjusted by the waveform shaping circuit 130.

The number of the pulses of FIG. 8 may be related to the bandwidths of the first to third bands. For example, the number of the pulses included in the region R1 may be larger than the number of the pulses included in the region R3. The bandwidth of the band of the signal ER3 corresponding to the region R1 may be larger than the bandwidth of the band of the signal ER1 corresponding to the region R3.

For example, the waveform shaping circuit 130 may adjust the number of pulses by attenuating the magnitudes of the pulses included in the optical signal S1 (e.g., by attenuating the magnitudes of the pulses to "0"). The waveform shaping circuit 130 may generate the optical signal S3 including an adjusted number of pulses (in the example of FIG. 6, m number of pulses of the region R2, and i number of pulses of the region R3). The output circuit 140 may generate the signals ER2 and ER3 of bands having bandwidths corresponding to the number of the pulses included in the optical signal S3. Therefore, the output circuit 140 may output the signals ER2 and ER3 of bands having bandwidths adjusted as the magnitudes of the pulses included in the optical signal S1 is attenuated.

The intervals between the pulses included in the optical signal of FIG. 8 may be related to the bands (e.g., first to third bands) of the signals ER1 to ER3 included in the signal S4 of FIG. 9.

The pulses included in the region R1 of FIG. 8 may include the pulses included in the region R1 of FIG. 6. The intervals between the pulses included in the region R1 of FIG. 6 are "Δf1". The pulses included in the region R3 of FIG. 8 may include the pulses included in the region R3 of FIG. 6. The intervals between the pulses included in the region R3 of FIG. 6 are "Δf3". "Δf3" may be larger than "Δf1". Therefore, the intervals between the pulses included in the region R3 may be larger than the intervals between the pulses included in the region R1 in FIG. 8.

Likewise, the intervals between the pulses included in the region R3 may be larger than the intervals between the pulses included in the region R2. The intervals between the pulses included in the region R2 may be larger than the intervals between the pulses included in the region R1.

As the intervals between pulses increase, the OE converting circuit 142 may output a signal of a higher band. For example, the pulses included in the region R1 of FIG. 8 may be converted into the signal ER1 of the first band of FIG. 9. The pulses included in the region R2 of FIG. 8 may be converted into the signal ER2 of the second band of FIG. 9. The pulses included in the region R3 of FIG. 8 may be converted into the signal ER3 of the third band of FIG. 9.

For example, the waveform shaping circuit 130 may adjust the intervals between the pulses included in the optical signal S3 by attenuating the pulses included in the optical signal S1 (e.g., by attenuating the magnitudes of the pulses to "0"). The waveform shaping circuit 130 may generate the optical signal S3 including pulses having adjusted intervals (in the example of FIG. 6, the pulses having the intervals of "Δf2" of the region R2, and the pulses having the intervals of "Δf3" of the region R3). The output circuit 140 may generate the signals ER2 and ER3 of bands corresponding to the intervals between the pulses included in the optical signal S3. Therefore, the output circuit 140 may output the signals ER2 and ER3 of bands adjusted as the magnitudes of the pulses included in the optical signal S1 is attenuated.

The intervals between the pulses included in the optical signal S3 of FIG. 8 may be related to the number of the bands (e.g., first to third bands) of the signals ER1 to ER3 included in the signal S4 of FIG. 9.

For example, the intervals between the pulses included in the optical signal M2 may have one of at least three values "Δf1", "Δf2", and "Δf3". Since the optical signal S3 of FIG. 8 is generated on the basis of the optical signal M2 of FIG. 6, the intervals between the pulses included in the optical signal S3 may have at least three different values. Therefore, the signal S4 of FIG. 9 may include at least three bands (first to third bands).

As described above with reference to FIG. 1, an external user (or another device) of the waveform generator 100 may adjust the characteristics of the optical signal S3 by means of the controlling circuit 100. For example, the user may adjust the magnitudes, phases, intervals, and number of the pulses included in the optical signal S3.

Since the signal S4 is generated on the basis of the optical signal S3, the user may adjust the characteristics of the signal S4. For example, the user signal S4 may adjust the magnitude and shape factor of the signal S4. The user may determine or select frequency bands of the signal S4. The user may adjust the number of the frequency bands of the signal S4. Therefore, the waveform generator 100 may output the signal S4 having a waveform generated according to an intention of the user.

Figure 10:
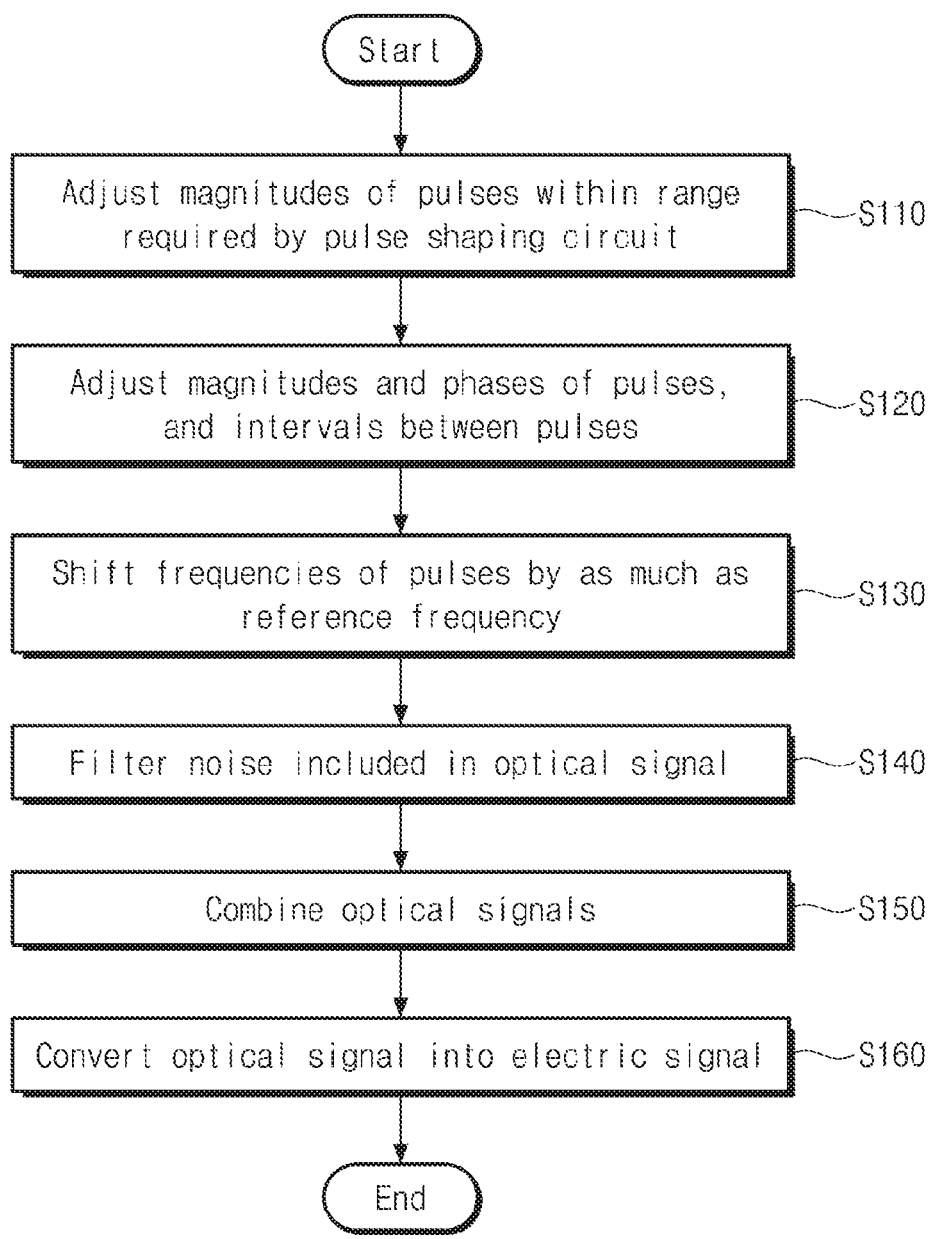
FIG. 10 is a flowchart illustrating an example operation of the waveform generator of FIG. 1.

FIG. 10 is a flowchart illustrating an example operation of the waveform generator of FIG. 1.

In operation S110, the AGC amplifying circuit 131 may adjust the magnitudes of the pulses included in the optical signal S1 on the basis of the control signal C2 received from the controlling circuit 150. The AGC amplifying circuit 131 may adjust the magnitudes of the pulses within a required reference range by means of the pulse shaping circuit 132. The AGC amplifying circuit 131 may generate the optical signal M1 including pulses having adjusted magnitudes.

In operation S120, the waveform shaping circuit 130 may adjust the characteristics (magnitude, phase, number, and intervals between pulses) of the pulses included in the optical signal M1 on the basis of the control signal C2. The waveform shaping circuit 130 may generate the optical signal M2 including pulses having adjusted characteristics.

In operation S130, the optical modulation circuit 133 may adjust the frequencies of the pulses included in the optical signal S1. For example, the optical modulation circuit 133 may generate the optical signal M3 by modulating the frequencies of the pulses. The optical modulation circuit 133 may increase or decrease the frequencies of the pulses by as much as a reference frequency In operation S140, the optical filter circuit 135 may block noise of the optical signal M3 generated in operation S130 so as to generate the optical signal M4.

In operation S150, the combining circuit 136 may generate the signal S3 by combining the optical signal S2 generated in operation S120 and the optical signal M4 generated in operation S140.

In operation S160, the output circuit 140 may photoelectrically convert the optical signal S3 generated in operation S150 to output the signal S4. For example, the signal S4 may be an electric signal.

Although FIG. 10 illustrates an embodiment in which operations S110 and S120 are performed prior to operations S130 and S140, the inventive concept may include all embodiments in which operations S110, S120, S130, and S140 are performed in an arbitrary order or simultaneously.

Figure 11:
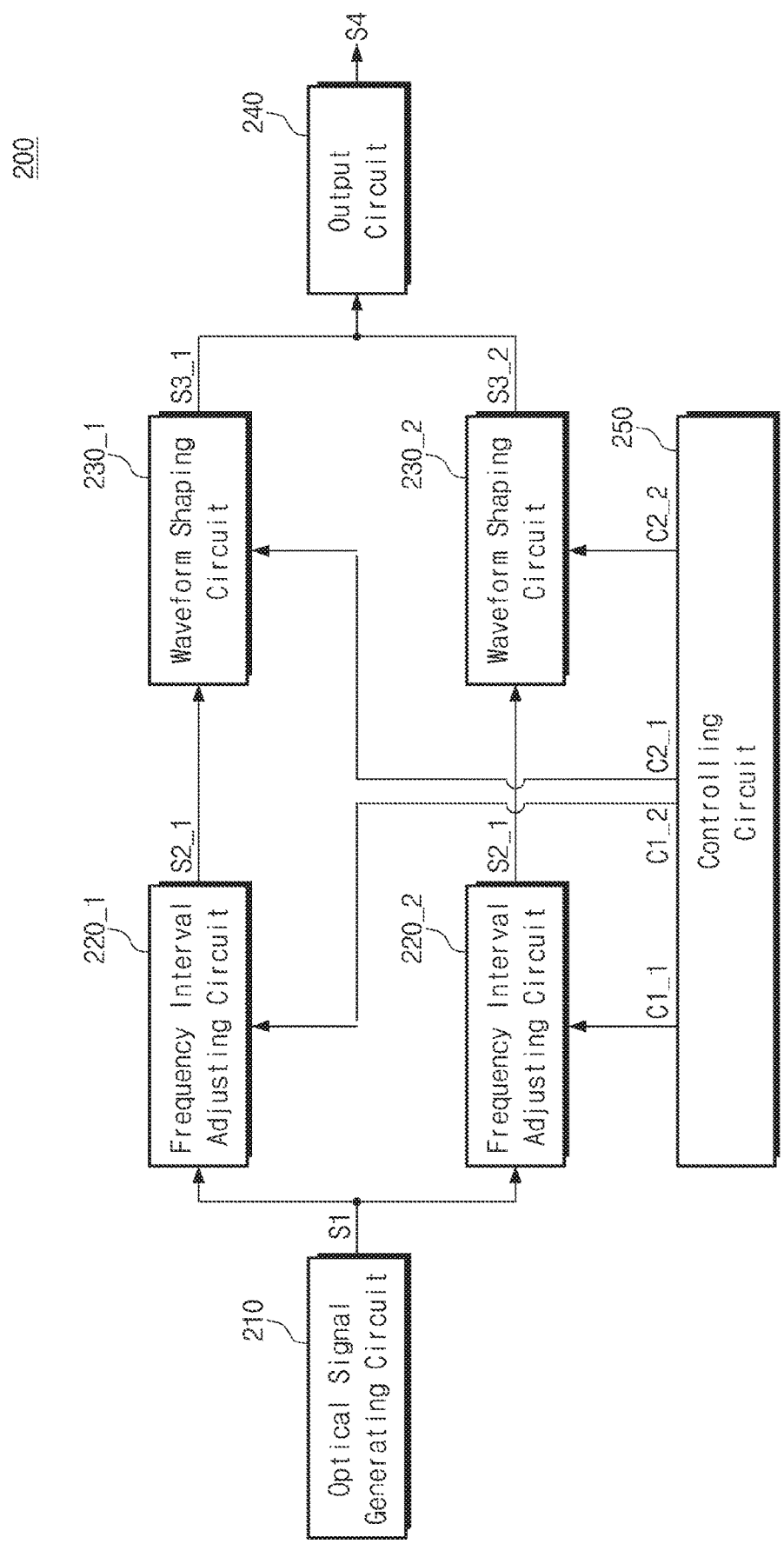
FIG. 11 is a block diagram illustrating a waveform generator according to an embodiment of the inventive concept.

FIG. 11 is a block diagram illustrating a waveform generator according to an embodiment of the inventive concept.

Referring to FIG. 11, a waveform generator 200 may include an optical signal generating circuit 210, frequency interval adjusting circuits 220_1 and 220_2, waveform shaping circuits 230_1 and 230_2, and an output circuit 240.

Since a specific configuration and operation of the optical signal generating circuit 210 of FIG. 11 are similar to those of the optical signal generating circuit 110 of FIG. 1, detailed descriptions thereof are not provided below. Since specific configurations and operations of the waveform shaping circuits 230_1 and 230_2 of FIG. 11 are similar to those of the waveform shaping circuit of FIG. 1, detailed descriptions thereof are not provided below. Since a specific configuration and operation of the output circuit 240 of FIG. 11 are similar to those of the output circuit 140 of FIG. 1, detailed descriptions thereof are not provided below. Since a specific configuration and operation of the controlling circuit 250 of FIG. 11 are similar to those of the controlling circuit 150 of FIG. 1, detailed descriptions thereof are not provided below.

However, the output circuit 240 of FIG. 11 may further include a combining circuit configured to combine an optical signal S3_1 and an optical signal S3_2. Alternatively, a separate combining circuit may be connected between the waveform shaping circuits 230_1 and 230_2, or the waveform shaping circuits 230_1 and 230_2 may include a combining circuit. Since a configuration and operation of the combining circuit are similar to those of the combining circuit 136 of FIG. 2, detailed descriptions thereof are not provided below.

The optical signal generating circuit 210 may output the optical signal S1 to the frequency interval adjusting circuits 220_1 and 220_2. The frequency interval adjusting circuits 220_1 and 220_2 may receive the optical signal S1 from the optical signal generating circuit 210. For example, the frequency interval adjusting circuits 220_1 and 220_2 may receive the optical comb signal included in the optical signal S1. The frequency interval adjusting circuits 220_1 and 220_2 may respectively receive control signals C1_1 and C1_2 from the controlling circuit 250.

The frequency interval adjusting circuit 220_1 may generate an optical signal S2_1 on the basis of the control signal C1_1 and the optical signal S1. The frequency interval adjusting circuit 220_2 may generate an optical signal S2_2 on the basis of the control signal C1_2 and the optical signal S1. For example, the frequency interval adjusting circuits 220_1 and 220_2 may adjust the intervals between the pulses included in the optical signal S1.

For example, the control signal C1_2 may indicate a first group of pulses determined to be attenuated among the pulses included in the optical signal S1. The control signal C1_2 may indicate a second group of pulses determined to be attenuated among the pulses included in the optical signal S1. The frequency interval adjusting circuit 220_1 may attenuate the first group of pulses to adjust the intervals between pulses. The frequency interval adjusting circuit 220_2 may attenuate the second group of pulses to adjust the intervals between pulses. An example operation of the frequency interval adjusting circuits 220_1 and 220_2 will be described in more detail with reference to FIG. 12.

The output circuit 240 may combine optical signals S3_1 and S3_2. For example, the output circuit 240 may include an element similar to the combining circuit 136 of FIG. 2 to combine the optical signals S3_1 and S3_2. The output circuit 240 may photoelectrically convert an optical signal generated by combining the optical signals S3_1 and S3_2.

The output circuit 240 may generate a signal on the basis of the optical signal S3_1 received from the waveform shaping circuit 230_1. The output circuit 240 may generate a signal on the basis of the optical signal S3_2 received from the waveform shaping circuit 230_2. The frequency band of the signal generated on the basis of the optical signal S3_1 may be different from the frequency band of the signal generated on the basis of the optical signal S3_2.

The frequency interval adjusting circuit 220_1 and the waveform shaping circuit 230_1 may be cascode-connected to the frequency interval adjusting circuit 220_2 and the waveform shaping circuit 230_2. Since the frequency interval adjusting circuits 220_1 and 220_2 and the waveform shaping circuits 230_1 and 230_2 are provided as a cascode structure, a plurality of processes for a single optical signal may be performed in parallel. For example, the waveform generator 200 may perform in parallel a process of generating the optical signal S3_1 on the basis of the optical signal S1 and a process of generating the optical signal S3_2 on the basis of the optical signal S1.

Although FIG. 11 illustrates a configuration including the frequency interval adjusting circuit 220_1 and the frequency interval adjusting circuit 220_2, the inventive concept may include any embodiment which includes either the frequency interval adjusting circuit 220_1 or the frequency interval adjusting circuit 220_2. For example, the waveform generator 200 may include only the frequency interval adjusting circuit 220_2. In this example, the optical signal generating circuit 210 may directly output the optical signal S1 to the waveform shaping circuit 230_1. The waveform shaping circuit 230_1 may operate on the basis of the optical signal S1.

Figure 12:
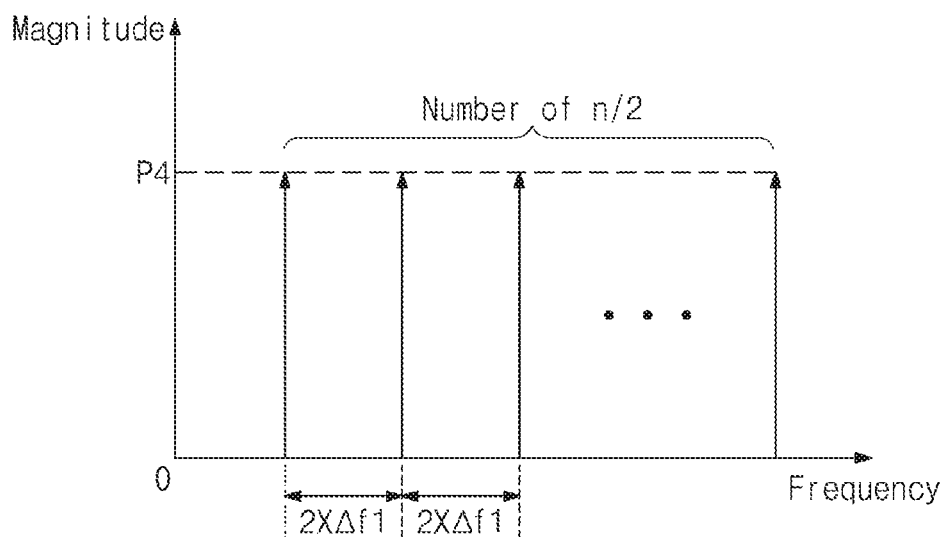
FIG. 12 is a graph illustrating an example optical signal generated by the frequency interval adjusting circuits of FIG. 11.

FIG. 12 is a graph illustrating an example optical signal generated by the frequency interval adjusting circuits of FIG. 11. In the example of FIG. 12, the x-axis may represent a frequency in hertz [Hz]. The y-axis may represent the magnitude of the pulses included in the optical signal S3_1 or S3_2.

An example operation of the frequency interval adjusting circuit 220_1 of FIG. 11 will be described with reference to FIG. 12. The operation of the frequency interval adjusting circuit 220_2 is similar to the operation of the frequency interval adjusting circuit 220_1, and is thus not described below. Referring to FIG. 12, the optical signal S2_1 may include a "2/n" number of pulses. The intervals between the pulses may be "2×Δf1". The magnitudes of the pulses may be "P4".

The frequency interval adjusting circuit 220_1 may adjust the intervals between the pulses included in the optical signal S1 in a frequency domain on the basis of the control signal C1_1.

The frequency interval adjusting circuit 220_1 may obtain information related to the intervals between pulses from the control signal C1_1. The frequency interval adjusting circuit 220_1 may adjust the intervals between pulses. A method of adjusting the intervals between pulses by the frequency interval adjusting circuit 220_1 is similar to a method of adjusting the intervals between pulses by the pulse shaping circuit 132 of FIG. 2, and is thus not described below. For example, the frequency interval adjusting circuit 220_1 may include at least one of a waveform shaping device, a periodic optical filter, or an arrayed grating filter to adjust the intervals between pulses.

The frequency interval adjusting circuit 220_1 may attenuate the magnitudes of pulses included in a specific group among the pulses included in the optical signal S1. For example, when comparing FIG. 4 and FIG. 12, the frequency interval adjusting circuit 220_1 may attenuate pulses located at jth positions (where j is an even number) based on a pulse corresponding to a lowest frequency among the pulses included in the optical signal S1. The fact that a pulse is located at a specific position represents that a graph of the pulse is displayed in correspondence to a specific point on an x-axis. Therefore, the intervals between the pulses included in the optical signal S2_1 may be two times the intervals between the pulses included in the optical signal S1. The number of the pulses included in the optical signal S2_1 may be half the number of the pulses included in the optical signal S1.

However, the operation of the frequency interval adjusting circuit 220_1 described above with reference to FIG. 12 is merely an example, and thus the inventive concept may include all embodiments of the frequency interval adjusting circuit 220_1 configured to adjust the intervals between pulses by attenuating pulses having arbitrary frequencies in response to a control of the controlling circuit 250.

Figure 13:
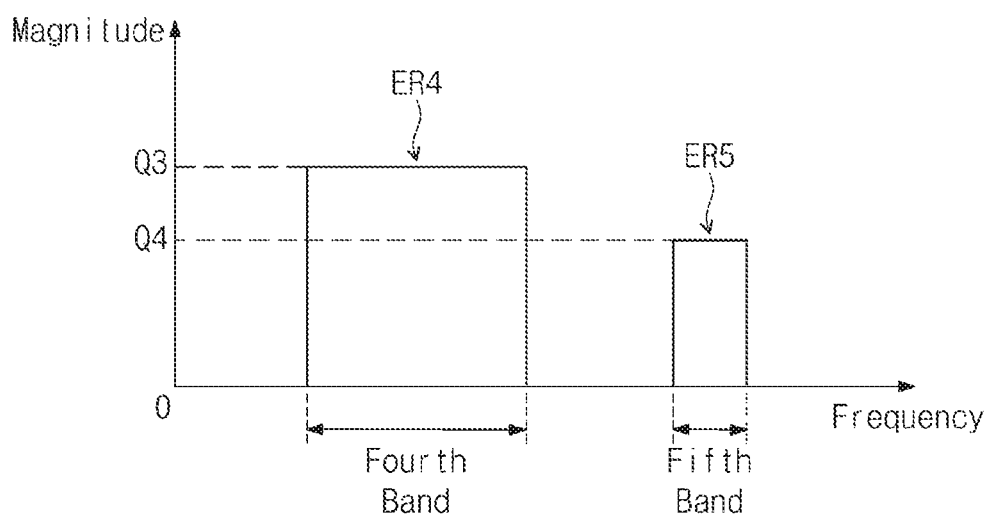
FIG. 13 is a graph illustrating an example signal generated by the output circuit of FIG. 11.

FIG. 13 is a graph illustrating an example signal generated by the output circuit of FIG. 11. In the example of FIG. 13, the x-axis may represent a frequency in hertz [Hz]. The y-axis may represent the magnitude of the signal S4.

Referring to FIG. 13, the signal S4 may include a signal ER4 of a fourth band. The magnitude of the signal ER4 may be "Q3". The signal S4 may include a signal ER5 of a fifth band. The magnitude of the signal S4 may be "Q4". The fourth and fifth bands may not overlap each other. Each of the signal ER4 and the signal ER5 may have a specific shape factor. The bandwidth of the fourth band may be larger than the bandwidth of the fifth band.

FIG. 13 illustrates the signals ER4 and ER5 having a flat magnitude. However, an embodiment of the inventive concept is not limited thereto, and it could be understood that the magnitudes of the signals ER4 and ER5 may vary with a frequency.

The output circuit 240 may photoelectrically convert the optical signal S3_1 to generate the signal ER4 of the fourth band. The output circuit 240 may photoelectrically convert the optical signal S4_1 to generate the signal ER5 of the fifth band. The frequency interval adjusting circuit 220_1 and the waveform shaping circuit 230_1 may process the optical signal S1 in response to a control of the controlling circuit 250 to generate the optical signal S3_1 corresponding to the signal ER4 of the fourth band. The frequency interval adjusting circuit 220_2 and the waveform shaping circuit 230_2 may process the optical signal S1 in response to a control of the controlling circuit 250 to generate the optical signal S3_2 corresponding to the signal ER5 of the fifth band.

The controlling circuit 250 may generate the control signals C1_1, C1_2, C2_1, and C2_2 in response to a user's command or a request of another device. The user may control the frequency interval adjusting circuit 220_1 and the waveform shaping circuit 230_1 by means of the controlling circuit 250 to adjust the characteristics of the signal ER4. The user may control the frequency interval adjusting circuit 220_2 and the waveform shaping circuit 230_2 by means of the controlling circuit 250 to adjust the characteristics of the signal ER5. For example, the waveform generator 200 may generate the signal S4 having frequency bands, bandwidths of the frequency bands, the number of the frequency bands, shaping factors, and magnitudes determined according to a user's command or a request of another device.

Figure 14:
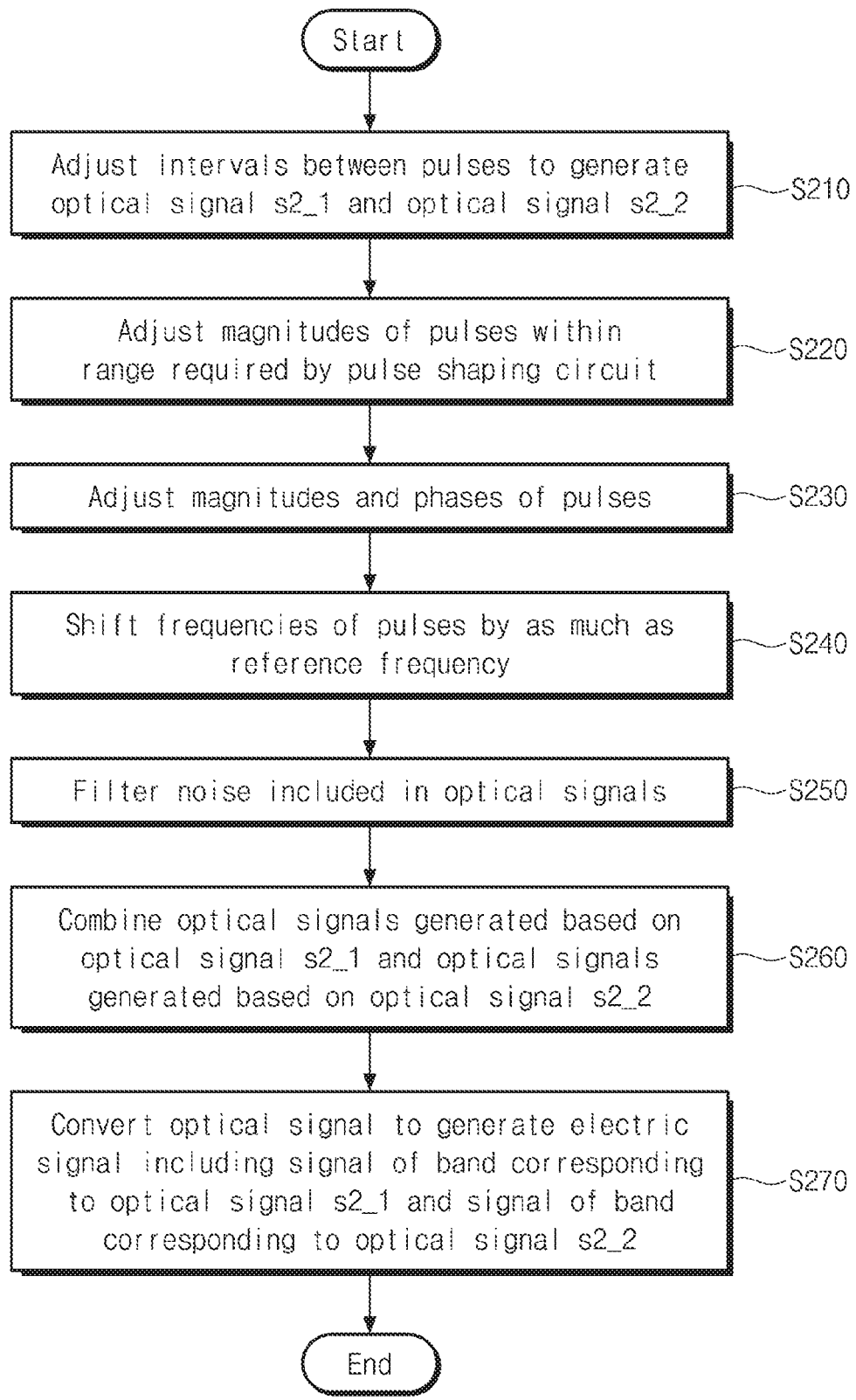
FIG. 14 is a flowchart illustrating an example operation of the waveform generator of FIG. 11.

FIG. 14 is a flowchart illustrating an example operation of the waveform generator of FIG. 11.

Operations S220 to S250 of FIG. 14 are similar to operations S110 to S140 of FIG. 10, are thus not described below.

In operation S210, the frequency interval adjusting circuits 220_1 and 220_2 may adjust the magnitudes of the pulses included in the optical signal S1 to generate the optical signals S2_1 and S2_2. The frequency interval adjusting circuits 220_1 and 220_2 may adjust the magnitudes of the pulses included in the optical signal S1 on the basis of the control signals C2_1 and C2_2 to adjust the intervals between the pulses.

In operation S260, the waveform shaping circuit 230_1 or a separate combining circuit may generate the optical signal S3_1 by combining the optical signal generated in operations S220 and S230 on the basis of the optical signal S2_1 and the optical signal generated in operations S240 and S250 on the basis of the optical signal S2_1. The waveform shaping circuit 230_2 or the separate combining circuit may generate the optical signal S3_2 by combining the optical signal generated in operations S220 and S230 on the basis of the optical signal S2_2 and the optical signal generated in operations S240 and S250 on the basis of the optical signal S2_2.

In operation S270, the output circuit 240 may generate a new optical signal by combining the optical signal S3_1 and the optical signal S3_2. The output circuit 240 may photoelectrically convert the combined signal to output the signal S4. The signal S4 may be an electric signal. The signal S4 may include a signal of a frequency band corresponding to the optical signal S3_1 and a signal of a frequency band corresponding to the optical signal S3_2. Since the optical signal S3_1 is generated on the basis of the optical signal S2_1 and the optical signal S3_2 is generated on the basis of the optical signal S2_2, the signal S4 may include a signal of a frequency band corresponding to the optical signal S2_1 and a signal of a frequency band corresponding to the optical signal S2_2.

Figure 15:
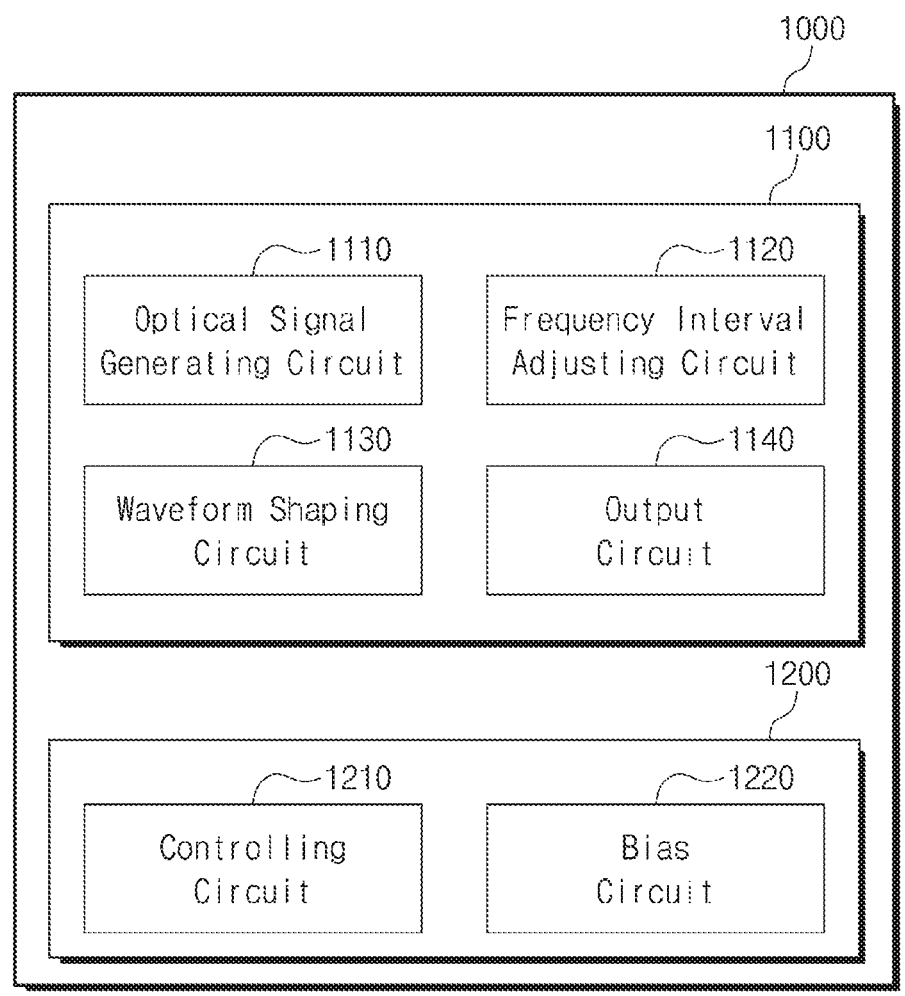
FIG. 15 is a block diagram illustrating a waveform generator according to an embodiment of the inventive concept.

FIG. 15 is a block diagram illustrating a waveform generator according to an embodiment of the inventive concept.

Referring to FIG. 15, a waveform generator 1000 may include an optical signal processing block 1100 and an electric signal processing block 1200. An optical signal generating circuit 1110, a frequency interval adjusting circuit 1120, a waveform shaping circuit 1130, and an output circuit 1140 may be arranged in the optical signal processing block 1100. Ta controlling circuit 1210 and a bias circuit 1220 may be arranged in the electric signal processing block 1200.

The waveform generator 1000 may be implemented as at least one semiconductor chip. For example, the waveform generator 1000 may be implemented as an indium arsenide/indium phosphide (InAs/InP) compound semiconductor chip based on a silicon photonics technology. The waveform generator 1000 may be implemented in a form of an optoelectronic integrated circuit including the optical signal generating block 1110 which operates on the basis of optical signals and the electric signal processing block 1200 which operates on the basis of electric signals.

Configurations and operations of the optical signal generating circuit 1110, the waveform shaping circuit 1130, the output circuit 1140, and the controlling circuit 1210 of FIG. 15 are similar to those of the optical signal generating circuit 110, the waveform shaping circuit 130, the output circuit 140, and the controlling circuit 150 of FIG. 1, and are thus not described below. A configuration and operation of the frequency interval adjusting circuit 1120 of FIG. 15 are similar to those of the frequency interval adjusting circuits 220_1 and 220_2 of FIG. 11, and are thus not described below.

The bias circuit 1220 of FIG. 15 may supply a bias voltage to the controlling circuit 1210. For example, the bias circuit 1220 may be supplied with a voltage from a power supply or the like outside the waveform generator 1000. The bias circuit 1220 may include a regulator or the like for supplying the bias voltage. The bias circuit 1220 may convert a voltage supplied through the regulator or the like. The bias circuit 1220 may supply the converted voltage to the controlling circuit 1210 as the bias voltage.

According to an embodiment of the inventive concept, signals having characteristics determined according to a user's command may be generated.

Although the example embodiments of the present invention have been described, it is understood that the present invention should not be limited to these example embodiments but various changes and modifications can be made by one ordinary skilled in the art within the spirit and scope of the present invention as hereinafter claimed.

What is claimed is:

1. A waveform generator comprising:
   an optical signal generating circuit configured to generate a first optical signal comprising pulses;
   a controlling circuit configured to generate a control signal indicating a first pulse to be attenuated among the pulses;
   a waveform shaping circuit configured to:
      attenuate a magnitude of the first pulse based on the control signal and the first optical signal, and
      generate a second optical signal comprising pulses corresponding to the pulses included in the first optical signal and the first pulse, the first pulse having the attenuated magnitude; and
   an output circuit configured to output an electric signal of bands corresponding to differences between frequencies of the pulses included in the second optical signal, based on the second optical signal,
   wherein a band corresponding to the first pulse among the bands of the electric signal is adjusted as the first pulse is selected based on the control signal.

2. The waveform generator of claim 1, wherein the output circuit outputs the electric signal of the band corresponding to the first pulse having a bandwidth adjusted as the first pulse is selected by the control signal.

3. The waveform generator of claim 1, wherein the waveform shaping circuit adjusts a phase of a second pulse among the pulses included in the first optical signal based on the control signal so as to generate the second optical signal comprising the second pulse having the adjusted phase.

4. The waveform generator of claim 3, wherein the output circuit outputs the electric signal having a shape factor, the shape factor varying as the phase of the second pulse is adjusted.

5. The waveform generator of claim 1, wherein the waveform shaping circuit comprises an amplifying circuit configured to adjust magnitudes of the pulses, included in the first optical signal, to magnitudes within a reference range.

6. The waveform generator of claim 5, wherein the waveform shaping circuit operates based on the pulses having the magnitudes within the reference range.

7. The waveform generator of claim 1, wherein the waveform shaping circuit further comprises a modulation circuit configured to modulate frequencies of the pulses included in the first optical signal.

8. The waveform generator of claim 7, wherein the waveform shaping circuit further comprises an oscillator configured to generate a signal of a reference frequency, and
   wherein the modulation circuit adjusts the frequencies of the pulses included in the first optical signal by as much as the reference frequency.

9. The waveform generator of claim 7, wherein the waveform shaping circuit further comprises a filter circuit configured to attenuate a magnitude of a residual component of the first optical signal after modulation by the modulation circuit.

10. The waveform generator of claim 7, wherein the waveform shaping circuit further comprises a combining circuit configured to output a third optical signal by combining the second optical signal with the first optical signal comprising the pulses having the modulated frequencies.

11. The waveform generator of claim 10, wherein the output circuit photoelectrically converts the third optical signal to output the electric signal.

12. A waveform generator comprising:
   a first frequency interval adjusting circuit configured to generate a second optical signal based on a first control signal, the first control signal indicating a first group of pulses to be attenuated among pulses of a first optical signal, the second optical signal comprising the first group of pulses having attenuated magnitudes;
   a second frequency interval adjusting circuit configured to generate a third optical signal based on a second control signal, the second control signal indicating a second group of pulses to be attenuated among the pulses of the first optical signal, the third optical signal comprising the second group of pulses having attenuated magnitudes; and
   an output circuit configured to generate an electric signal of a first band based on the second optical signal, and generate an electric signal of a second band based on the third optical signal,
   wherein the first band is adjusted as the first group of pulses is selected based on the first control signal, the second band is adjusted as the second group of pulses is selected based on the second control signal, and
   wherein the first band does not overlap the second band.

13. The waveform generator of claim 12, wherein a bandwidth of the first band is associated with a number of the pulses included in the second optical signal, and a bandwidth of the second band is associated with a number of the pulses included in the third optical signal.

14. The waveform generator of claim 12, further comprising a waveform shaping circuit configured to adjust phases of the pulses included in the second optical signal to generate a fourth optical signal comprising the pulses having the adjusted phases.

15. The waveform generator of claim 14, wherein the output circuit outputs, based on the fourth optical signal, the electric signal of the first band having a shape factor, the shape factor being adjusted as the phases of the pulses included in the second optical signal are adjusted.

\* \* \* \* \*